US012606118B1

(12) United States Patent
Deutschmann et al.

(10) Patent No.: US 12,606,118 B1
(45) Date of Patent: Apr. 21, 2026

(54) CURTAIN AIRBAG ASSEMBLY INCLUDING RIGID BAR FOR ATTACHING INFLATABLE CURTAIN AIRBAG AND VEHICLES INCLUDING THE SAME

(71) Applicant: TOYODA GOSEI CO., LTD, Kiosu (JP)

(72) Inventors: Roy Deutschmann, South Lyon, MI (US); Daniel Bujaidar, Washington, MI (US); Roland Furtado, Novi, MI (US)

(73) Assignee: Toyoda Gosei Co., LTD., Kiosu (JP)

( * ) Notice: Subject to any disclaimer, the term of this patent is extended or adjusted under 35 U.S.C. 154(b) by 0 days.

(21) Appl. No.: 18/924,286

(22) Filed: Oct. 23, 2024

(51) Int. Cl.
B60R 21/232 (2011.01)
B60R 21/213 (2011.01)
B60R 21/235 (2006.01)

(52) U.S. Cl.
CPC .......... B60R 21/232 (2013.01); B60R 21/213 (2013.01); B60R 2021/23542 (2013.01)

(58) Field of Classification Search
CPC ... B60R 21/213; B60R 21/214; B60R 21/232; B60R 2021/23542
See application file for complete search history.

(56) References Cited

U.S. PATENT DOCUMENTS

| | | | |
|---|---|---|---|
| 5,344,182 A | 9/1994 | Lauritzen et al. | |
| 5,605,346 A * | 2/1997 | Cheung ................. | B60R 21/232 |
| | | | 280/730.2 |
| 5,752,713 A * | 5/1998 | Matsuura .......... | B60R 21/23138 |
| | | | 280/730.2 |
| 5,899,486 A * | 5/1999 | Ibe ........................ | B60R 21/232 |
| | | | 280/730.2 |
| 6,254,123 B1 * | 7/2001 | Urushi .................. | B60R 21/213 |
| | | | 280/730.2 |
| 6,279,941 B1 * | 8/2001 | Nakajima ............. | B60R 21/213 |
| | | | 280/730.2 |
| 6,474,678 B1 * | 11/2002 | Boxey ................... | B60R 21/233 |
| | | | 280/730.2 |
| 7,011,337 B2 * | 3/2006 | Aoki ..................... | B60R 21/232 |
| | | | 280/730.2 |
| 7,125,038 B2 * | 10/2006 | Gammill ............... | B60R 21/232 |
| | | | 280/730.2 |
| 7,175,196 B2 * | 2/2007 | Boxey ................... | B60R 21/232 |
| | | | 280/730.2 |
| 7,516,978 B2 * | 4/2009 | Quach .................. | B60R 21/213 |
| | | | 280/730.2 |
| 8,632,093 B2 * | 1/2014 | Fischer ................. | B60R 21/217 |
| | | | 280/730.2 |

(Continued)

*Primary Examiner* — Laura Freedman
(74) *Attorney, Agent, or Firm* — Dinsmore & Shohl LLP

(57) ABSTRACT

A curtain airbag assembly includes an inflator, an inflatable curtain airbag, and a rigid bar. The inflatable curtain airbag includes a pocket portion and a body portion extending from the pocket portion. The pocket portion defines one or more pockets and a plurality of cutouts spaced apart from one another along a vehicle longitudinal direction of the pocket portion. The body portion inflates upon receiving gas from the inflator when activated. The rigid bar extends through the one or more pockets and is received within a plurality of receiving members mounted to a vehicle body member of a vehicle, thereby securing the curtain airbag assembly to the vehicle body member.

12 Claims, 3 Drawing Sheets

(56)  References Cited

U.S. PATENT DOCUMENTS

|  |  |  |  |  |
|---|---|---|---|---|
| 8,651,516 B2 * | 2/2014 | Kim | ...................... | B60R 21/232 |
|  |  |  |  | 280/739 |
| 9,539,974 B2 * | 1/2017 | Fukuda | ................. | B60R 21/232 |
| 9,771,048 B2 * | 9/2017 | Min | .................... | B60R 21/2338 |
| 10,471,924 B2 * | 11/2019 | Min | ...................... | B60R 21/214 |
| 11,318,907 B2 | 5/2022 | Wang et al. |  |  |
| 11,760,298 B2 | 9/2023 | Kosten et al. |  |  |
| 2005/0057023 A1 * | 3/2005 | Burton | ................. | B60R 21/232 |
|  |  |  |  | 280/730.2 |
| 2005/0206135 A1 * | 9/2005 | Nelson | ............... | B60R 21/2338 |
|  |  |  |  | 280/730.2 |
| 2008/0122203 A1 * | 5/2008 | Steinbach | .............. | B60N 3/026 |
|  |  |  |  | 280/728.2 |
| 2011/0248484 A1 | 10/2011 | Scott et al. |  |  |
| 2020/0079314 A1 * | 3/2020 | Zawisa | ................. | B60R 21/232 |

* cited by examiner

CURTAIN AIRBAG ASSEMBLY INCLUDING RIGID BAR FOR ATTACHING INFLATABLE CURTAIN AIRBAG AND VEHICLES INCLUDING THE SAME

TECHNICAL FIELD

The present specification generally relates to curtain airbags for vehicles and, more specifically, vehicles including curtain airbags that facilitate quicker and easier installation into the vehicle.

BACKGROUND

Curtain airbags, also known as side curtain airbags, are designed to protect the heads of passengers in the event of a side collision or rollover. A curtain airbag assembly, which includes a folded airbag and an inflator, is mounted inside a roof structure of the vehicle, typically along an edge of a roof frame above the doors and windows. In the event of a side collision or rollover, the airbag deploys downward to cover the side windows and protect passengers from impact with the window, side structure, or external objects.

During installation of the curtain airbag assembly, the inflator is positioned along the roof frame based on a location feature or marker and fastened to the roof frame. Thereafter, one by one, a plurality of fastening members extending from the airbag are fastened, such as by bolts, screws, or the like, to a vehicle body member such as the roof frame or pillars of the vehicle. This may be a time consuming process requiring each individual fastening member to be individually secured to the vehicle. Additionally, the fastening members may increase the manufacturing cost and time of the airbag by requiring each fastening member to be individually attached.

Accordingly, a need exists for improved curtain airbag assemblys that allow for quicker installation into the vehicle while also reducing the manufacturing cost and time of the airbag itself.

SUMMARY

In one embodiment, a curtain airbag assembly includes an inflator, an inflatable curtain airbag including a pocket portion defining one or more pockets and a plurality of cutouts spaced apart from one another along a vehicle longitudinal direction of the pocket portion, and a body portion extending from the pocket portion, the body portion inflating upon receiving gas from the inflator when activated, and a rigid bar extending through the one or more pockets.

In another embodiment, a curtain airbag assembly includes an inflator, an inflatable curtain airbag including an attachment portion defining a plurality of attachment holes spaced apart from one another along a vehicle longitudinal direction of the attachment portion, and a body portion extending from the attachment portion, the body portion inflating upon receiving gas from the inflator when activated, and a rigid bar defining a plurality of receiving holes spaced apart from one another along the vehicle longitudinal direction at locations corresponding to the plurality of attachment holes.

In yet another embodiment, a vehicle includes a vehicle body member, a plurality of receiving members spaced apart from one another and mounted to the frame, and a curtain airbag assembly including an inflator, an inflatable curtain airbag including a pocket portion defining one or more pockets and a plurality of cutouts spaced apart from one another along a vehicle longitudinal direction, and a body portion extending from the pocket portion, the body portion inflating upon receiving gas from the inflator when activated, and a rigid bar extending through the one or more pockets, wherein each receiving member of the plurality of receiving members engages the rigid bar to secure the inflatable curtain airbag to the frame.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
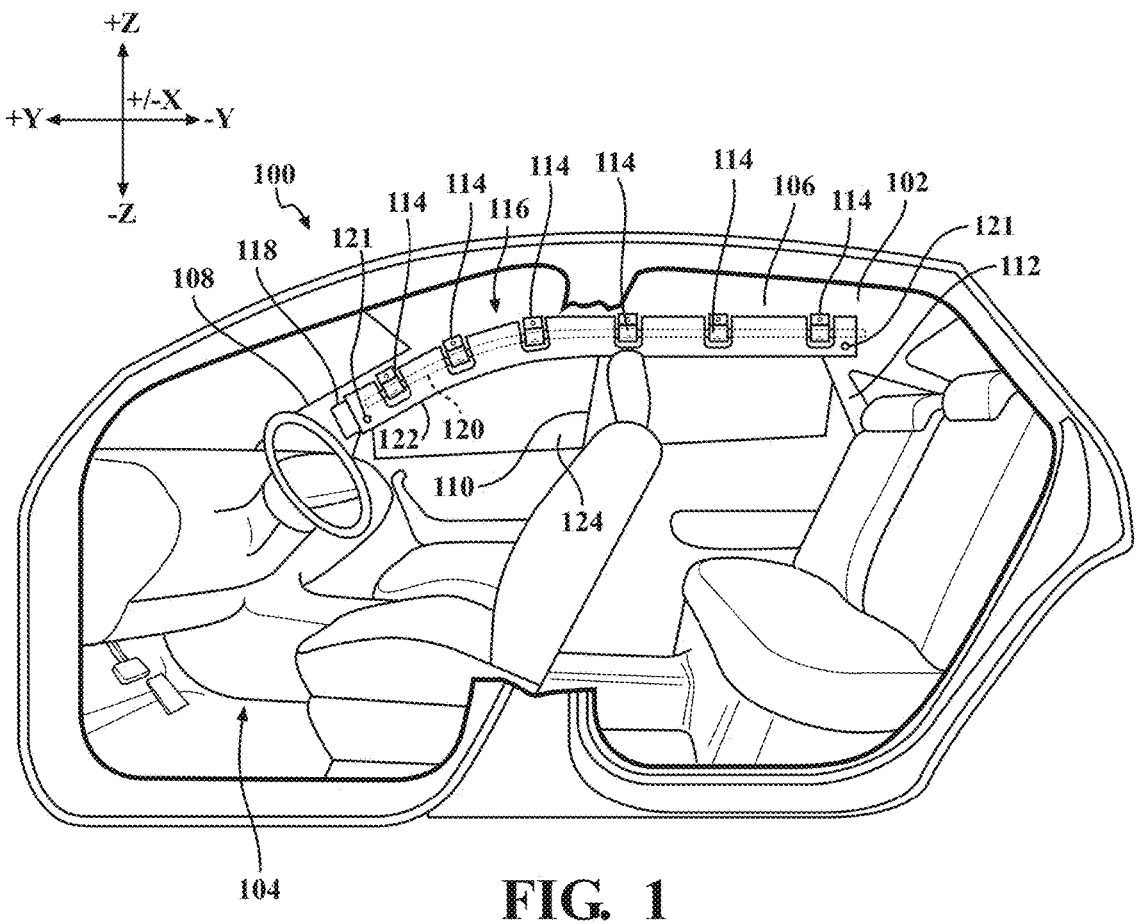
FIG. 1 schematically depicts a partial cutaway side view of a vehicle including an embodiment of a curtain airbag assembly mounted to a vehicle body member of the vehicle, according to one or more embodiments shown and described herein.

Embodiments described herein are directed to curtain airbag assemblies including a rigid bar for attaching an inflatable curtain airbag to a frame of a vehicle. The curtain airbag assembly includes an inflator, an inflatable curtain airbag, and a rigid bar. The inflatable curtain airbag includes a pocket portion and a body portion extending from the pocket portion. The pocket portion defines one or more pockets and a plurality of cutouts spaced apart from one another along a vehicle longitudinal direction. The body portion inflates, and deploys, upon receiving gas from the inflator when activated. The rigid bar extends through the one or more pockets and is received within a plurality of receiving members mounted to a vehicle body member of a vehicle, thereby quickly and easily securing the curtain airbag assembly to the vehicle. Various embodiments of the curtain airbag assembly and the operation of the curtain airbag assembly are described in more detail herein. Whenever possible, the same reference numerals will be used throughout the drawings to refer to the same or like parts.

As used herein, the term "vehicle longitudinal direction" refers to the forward-rearward direction of the vehicle (i.e., in the +/−vehicle Y direction depicted in FIG. 1). The term "vehicle lateral direction" refers to the cross-vehicle direction (i.e., in the +/−vehicle X direction depicted in FIG. 1), and is transverse to the vehicle longitudinal direction. The term "vehicle vertical direction" refers to the upward-downward direction of the vehicle (i.e., in the +/−vehicle Z direction depicted in FIG. 1). As used herein, "upper" and "above" are defined as the positive Z direction of the coordinate axes shown in the drawings. "Lower" and "below" are defined as the negative Z direction of the coordinate axes shown in the drawings. As used herein, the terms "inboard" and "outboard" may be used herein to refer to a relative orientation in the lateral direction. For example, "outboard" refers to a relative location closer to or facing a lateral side of the vehicle than a longitudinal center of the vehicle. Conversely, "inboard" refers to a relative location closer to or facing the longitudinal center of the vehicle than the lateral side of the vehicle.

Referring now to FIG. 1, a vehicle 100 is partially illustrated according to one or more embodiments described herein. The vehicle 100 includes a frame 102 defining a passenger compartment 104. The frame 102 includes a roof rail 106 and a plurality of pillars extending from the roof rail 106 at their upper ends. The pillars may include an A-pillar 108, a B-pillar 110, and a C-pillar 112. A plurality of receiving members 114 are provided on a vehicle body member extending along the vehicle longitudinal direction. The frame 102, the roof rail 106, the A-pillar 108, the B-pillar 110, and the C-pillar 112 are all non-limiting examples of the vehicle body member to which a curtain airbag assembly 116 may be secured.

The curtain airbag assembly 116 is secured to the vehicle body member via the receiving members 114. The curtain airbag assembly 116 includes an inflator 118, a rigid bar 120, and an inflatable curtain airbag 122. The inflatable curtain airbag 122 receives gas from the inflator 118. The curtain airbag assembly 116 also includes a sensor and a control system (not shown) that detects a collision/rollover or impending collision/rollover and transmits an activation signal to the inflator 118. Although the inflator 118 is illustrated in FIG. 1 as being located at a front side of the curtain airbag assembly 116, the location of the inflator 118 is not limited thereto. The inflator 118 may be one of several types, such as pyrotechnic, stored gas, or a combination inflator and may be a single or multistage inflator. The inflator 118 may be stored at any suitable location relative to the inflatable curtain airbag 122. The inflator 118 may be located at any suitable location along the curtain airbag assembly 116 including a center portion, a rear side, or any intermediate location between the front side and the rear side of the curtain airbag assembly 116. When the inflator 118 is a pyrotechnic inflator, the inflator 118 may contain a propellant that ignites to rapidly produce inflation gas in response to receipt of the activation signal. The inflatable curtain airbag 122 extends along the vehicle longitudinal direction from the A-pillar 108 to the C-pillar 112 in both a stowed condition (as shown in FIG. 1) prior to receiving gas from the inflator 118 and a deployed condition.

In the event of an actual or impending collision, the inflatable curtain airbag 122 may expand downward in the vehicle vertical direction along a side of the vehicle 100 between one or more passengers of the vehicle 100 and one or more lateral surfaces of the vehicle 100 such as side windows 124 and the pillars 108, 110, 112 of the vehicle 100.

The inflatable curtain airbag 122 may normally reside in the stowed condition, in which the inflatable curtain airbag 122 is concealed behind an interior trim of the vehicle 100 such as, for example, a lateral headliner trim. Prior to installation in the vehicle 100, the inflatable curtain airbag 122 may be compacted into the stowed condition, such as by rolling, folding, or a combination thereof, such that the inflatable curtain airbag 122 assumes an elongated shape extending along a pathway with a length that is much greater than a height or width of its cross-sectional shape.

Once compacted into the stowed condition, the inflatable curtain airbag 122 may be retained in the stowed condition through the conventional use of wrappers, fasteners, or the like to facilitate shipping and installation. As described in more detail herein, the inflatable curtain airbag 122 may be secured to the vehicle 100 by engaging the inflatable curtain airbag 122 with the receiving members 114 mounted to the frame 102 of the vehicle 100. In the embodiment illustrated in FIG. 1, and as described in more detail herein, the receiving members 114 are positioned within respective cutouts or recesses of the inflatable curtain airbag 122 to engage the rigid bar 120.

The inflatable curtain airbag 122 may be generally formed from two layers of flexible material such as a woven or non-woven fabric, and may include an inboard fabric layer at an inboard side of the inflatable curtain airbag 122 and an outboard fabric layer at an outboard side of the inflatable curtain airbag 122. According to one example, the inflatable curtain airbag 122 is generally constructed from a woven nylon fabric, but other fabrics or flexible materials may be used. The inboard and outboard fabric layers may be secured together at a peripheral edge, for example, via peripheral stitching. In the alternative, the inboard and outboard fabric layers may be secured together via mechanical fastening, adhesives, one-piece weaving, stitching, radio frequency (RF) welding, ultrasonic welding, or any other suitable method known in the art.

Although the curtain airbag assembly 116 is illustrated in FIG. 1 as being mounted on a passenger side of the vehicle 100, it should be appreciated that the present disclosure is equally applicable to curtain airbags installed at other locations the vehicle 100 such as, for example, a driver side of the vehicle 100. A curtain airbag provided on the driver side is intended to protect a driver or operator from impact with various forward surfaces of the vehicle 100 such as, for example, a steering wheel, instrument panel, and the like.

Figure 2:
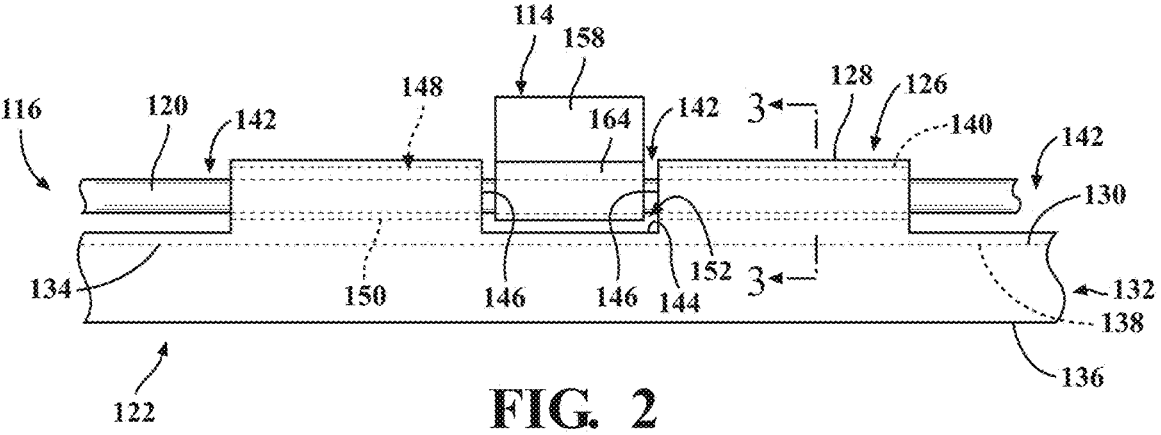
FIG. 2 schematically depicts a partial side view of the curtain airbag assembly of FIG. 1 defining a plurality of cutouts and engaging a receiving member, according to one or more embodiments shown and described herein.

Referring now to FIG. 2, the curtain airbag assembly 116 is illustrated including the inflatable curtain airbag 122 and the rigid bar 120. As described herein, the inflatable curtain airbag 122 may be formed in any suitable manner including one or more layers of flexible material. In embodiments, the inflatable curtain airbag 122 is formed by one-piece weaving such that the inflatable curtain airbag 122 is a one-piece, monolithic structure including both inflatable and non-inflatable portions. The inflatable curtain airbag 122 includes a pocket portion 126 having an upper edge 128 and an opposite lower edge 130, and a body portion 132 having an upper edge 134 and an opposite lower edge 136. It should be appreciated that at least a portion of the body portion 132 is inflatable upon receiving gas from the inflator 118 (FIG. 1).

In embodiments, a lower weaving line 138, formed by a thread or any other suitable stitching material, is provided to define the lower edge 130 of the pocket portion 126 and the upper edge 134 of the body portion 132. Accordingly, the body portion 132 extends from the lower edge 130 of the pocket portion 126. In embodiments, an upper weaving line 140, formed by a thread or any other suitable stitching material, is provided below the upper edge 128 of the pocket portion 126.

As shown in FIG. 2, a plurality of cutouts 142 are formed within the pocket portion 126 by removing individual, spaced apart sections of the pocket portion 126 or, in some embodiments, forming discontinuous pockets 248 in the pocket portion 126. Each cutout 142 is defined by a lower cutout edge 144 and a pair of side cutout edges 146. As shown, the lower cutout edge 144 is spaced apart from the lower weaving line 138 so as to not intersect the body portion 132 of the inflatable curtain airbag 122. The pair of side cutout edges 146 extend to the upper edge 128 of the pocket portion 126 so as to be open at the upper edge 128. A height of the pair of side cutout edges 146 defines a height of the cutout 142 extending in the vehicle vertical direction, and a distance between the pair of side cutout edges 146 defines a length of the cutout 142 extending in the vehicle longitudinal direction. Although three cutouts 142 are depicted, it should be appreciated that the inflatable curtain airbag 122 may have any number of cutouts 142 extending along a length of the inflatable curtain airbag 122 in the vehicle longitudinal direction.

Figure 3:
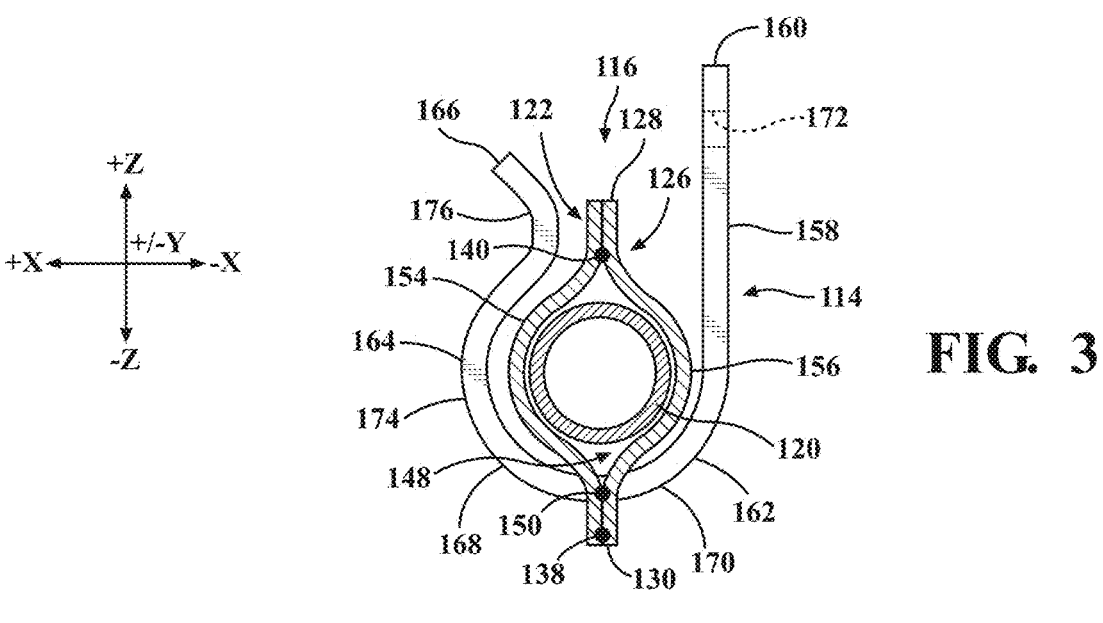
FIG. 3 schematically depicts a cross-sectional view of the curtain airbag assembly of FIG. 1 engaging the receiving member taken along line 3-3 of FIG. 2, according to one or more embodiments shown and described herein.

As noted above, the curtain airbag assembly 116 includes the rigid bar 120 extending through the inflatable curtain airbag 122. Specifically, the rigid bar 120 extends through a plurality of pockets 148 defined within the pocket portion 126 above the lower weaving line 138 and below the upper weaving line 140, when provided. The rigid bar 120 may be formed from any suitable material such as, for example, metal, plastic, or the like. More particularly, the rigid bar 120 may be formed from stainless steel, aluminum, polyvinyl chloride (PVC), Acrylonitrile butadiene styrene (ABS), or the like. In embodiments, the rigid bar 120 is a continuous, one-piece, monolithic member. In other embodiments, the rigid bar 120 is formed from a plurality of interconnected rigid bar segments that permit the rigid bar 120 to fold or collapse for purposes of reducing size for packaging and shipping. In embodiments, the rigid bar 120 is a formed from a rigid material having a rigidity greater than a rigidity of the material that forms the inflatable curtain airbag 122, specifically the pocket portion 126 and the body portion 132. As shown, the rigid bar 120 has a circular cross-sectional shape. However, it should be appreciated that the rigid bar 120 may have any suitable cross-sectional shape such as, for example, square or rectangular cross-sectional shape such that an inboard surface and an outboard surface of the rigid bar 120 are flat rather than curved, as shown in FIG. 3.

In embodiments, a restriction weaving line 150, formed by a thread or any other suitable stitching material, is provided above the lower weaving line 138. The restriction weaving line 150 reduces a height of the pockets 148 in the vehicle vertical direction. Accordingly, the reduction in the height of the pockets 148 limits movement of the rigid bar 120, which is received within the pockets 148, in the vehicle vertical direction.

With the rigid bar 120 inserted into the pockets 148 of the pocket portion 126 of the inflatable curtain airbag 122, a gap 152 is provided between the rigid bar 120 and the lower cutout edge 144 of the inflatable curtain airbag 122. The gap 152 has a height defined by a lower surface of the rigid bar 120 and the lower cutout edge 144. As noted above, the restriction weaving line 150 limits vertical movement of the rigid bar 120 in the vehicle vertical direction, thereby maintaining the height of the gap 152. Accordingly, the restriction weaving line 150 is provided above the lower cutout edge 144. Without the restriction weaving line 150 being provided in the inflatable curtain airbag 122, the height of the gap 152 may be reduced, thereby making installation of the inflatable curtain airbag 122 onto the frame 102 of the vehicle 100 (FIG. 1) more difficult, as described in more detail herein.

As shown in FIG. 2, a receiving member 114 extends through the cutout 142 and engages the rigid bar 120, thereby securing the inflatable curtain airbag 122 to the receiving member 114, which, as shown in FIG. 1, is mounted to the frame 102 of the vehicle 100. Although only a single receiving member 114 is depicted in FIG. 2 within one of the cutouts 142, it should be appreciated that a receiving member 114 may be positioned within respective cutouts 142 and received within the gap 152 defined by the rigid bar 120 and the lower cutout edge 144 of the respective cutout 142.

Referring now to FIG. 3, a cross-sectional side view taken along line 3-3 of FIG. 2 is depicted illustrating the rigid bar 120 engaging the receiving member 114 and extending through a pocket 148 formed in the inflatable curtain airbag 122. The pocket 148 formed in the pocket portion 126 is defined by an inboard fabric layer 154 and an outboard fabric layer 156 that, as discussed herein, may be secured together via mechanical fastening, adhesives, one-piece weaving, stitching, RF welding, ultrasonic welding, or any other suitable method known in the art.

As shown in FIG. 3, the inboard fabric layer 154 and the outboard fabric layer 156 are joined together at one or more locations. Specifically, as discussed herein, the inboard fabric layer 154 and the outboard fabric layer 156 may be joined by the lower weaving line 138, which distinguishes between the pocket portion 126 and the body portion 132. The inboard fabric layer 154 and the outboard fabric layer 156 may also be joined by the upper weaving line 140 below the upper edge 128 of the pocket portion 126 and, in some embodiments, the restriction weaving line 150 formed between the lower weaving line 138 and the upper weaving line 140. Accordingly, the rigid bar 120 extends within the pocket 148 below the upper weaving line 140 and above the restriction weaving line 150, when provided. Alternatively, the rigid bar 120 extends within the pocket 148 below the upper weaving line 140 and above the lower weaving line 138 when the restriction weaving line 150 is not provided.

In embodiments, the receiving members 114 include any suitable structure for retaining the rigid bar 120 extending through the pocket 148 of the inflatable curtain airbag 122. In embodiments, the receiving member 114 is formed as a retaining hook to receive and retain the rigid bar 120 upon being engaged with the receiving member 114 having any suitable geometry corresponding to the rigid bar 120. As shown in FIG. 3, the receiving member 114 includes an outboard wall 158 having an upper end 160 and an opposite lower end 162, an inboard wall 164 having an upper end 166 and an opposite lower end 168, and a connecting wall 170 extending between the lower end 162 of the outboard wall 158 and the lower end 168 of the inboard wall 164. The receiving members 114 may be formed from any suitable material such as, for example, stainless steel, aluminum, polyvinyl chloride (PVC), Acrylonitrile butadiene styrene (ABS), or the like. However, as described in more detail herein, in embodiments, at least the inboard wall 164 is formed from a deformable material and/or resilient material such that the inboard wall 164 may deflect or bend away from the outboard wall 158.

In operation, receiving members 114 are mounted to the frame 102 of the vehicle 100 (FIG. 1) such as, for example, the roof rail 106 (FIG. 1) at the outboard wall 158 at predetermined locations. The outboard wall 158 may be mounted to the frame 102 in any suitable manner such as, for example, mechanical fastening, welding, or any other suitable method known in the art. In embodiments, as shown in FIG. 3, a hole 172 is formed in the outboard wall 158 such that a fastener may be inserted through the hole 172 to secure the receiving member 114 to the frame 102 of the vehicle 100. The hole 172 may be formed proximate the upper end 160 of the outboard wall 158 such that the inboard wall 164 does not interfere with inserting a fastener through the hole 172 and fastening the receiving member 114 to the frame 102 of the vehicle 100.

In embodiments, the inboard wall 164 has a serpentine shape to accommodate the rigid bar 120 having a circular cross-sectional shape. Similarly, in embodiments, the connecting wall 170 has a curved shape to accommodate the rigid bar 120 and provide a smooth transition from the inboard wall 164 to the outboard wall 158. With more particularly, the inboard wall 164 has a first curved portion 174 extending upwardly in the vehicle vertical direction from the lower end 168 of the inboard wall 164, and a second curved portion 176 extending downwardly in the vehicle vertical direction from the upper end 166 of the inboard wall 164 to the first curved portion 174. As the first curved portion 174 extends upwardly, the first curved portion 174 extends in the vehicle lateral direction toward the outboard wall 158. As the second curved portion 176 extends upwardly from the first curved portion 174, the second curved portion 176 extends in the vehicle lateral direction opposite the outboard wall 158. As such, a distance between the outboard wall 158 and an outboard most point of the second curved portion 176 closest to the outboard wall 158 is less than a distance between the outboard wall 158 and the first curved portion 174.

As shown in FIG. 3, the rigid bar 120 has an outer diameter greater than the distance between the second curved portion 176 of the inboard wall 164 and the outboard wall 158. In operation, the rigid bar 120 is inserted into the receiving member 114 by pressing the rigid bar 120 into a space between the outboard wall 158 and the inboard wall 164. In doing so, the rigid bar 120 contacts the second curved portion 176 and applies an inward force to deflect the inboard wall 164 away from the outboard wall 158, thus allowing the rigid bar 120 to pass the second curved portion 176 and be received between a space defined by the first curved portion 174, the connecting wall 170, and the outboard wall 158. As such, the outboard wall 158, the connecting wall 170, and the first curved portion 174 define a receiving portion to receive the rigid bar 120, and the second curved portion 176 defines a retaining portion configured to permit the rigid bar 120 to be received within the receiving portion and inhibit the rigid bar 120 from being removed from the receiving portion. Although installation of the inflatable curtain airbag 122 is described herein by engaging the rigid bar 120 with the receiving members 114, it should be appreciated that the inflator 118 (FIG. 1) may be initially attached to the vehicle body member prior to engaging the rigid bar 120 with the receiving members 114, or subsequent to engaging the rigid bar 120 with the receiving members 114. The inflator 118 may be attached to the vehicle body member in any suitable manner, such as by using fasteners, for example, bolts, screws, or the like. In other embodiments, the inflatable curtain airbag 122 may be additionally attached to the vehicle body member subsequent to engaging the rigid bar 120 with the receiving members 114. For example, the inflatable curtain airbag 122 may be attached to the vehicle body member in any suitable manner, such as by using fasteners, for example, bolts, screws, or the like, extending through holes 121 formed at least at opposite ends of the inflatable curtain airbag 122, as shown in FIG. 1. Although the holes 121 are shown formed at opposite ends of the inflatable curtain airbag 122 in FIG. 1, it should be appreciated that holes 121 may be formed at any suitable location along the length of the inflatable curtain airbag 122, such as proximate a middle portion of the inflatable curtain airbag 122 in the vehicle longitudinal direction. Additionally, it should be appreciated that attaching the inflatable curtain airbag 122 via fasteners through the holes 121 serves to securely attach the inflatable curtain airbag 122 to the vehicle body member while attachment of the inflatable curtain airbag 122 to the vehicle body member serves to provide support for positioning and mounting the inflatable curtain airbag 122 on the vehicle body member.

Figure 4:
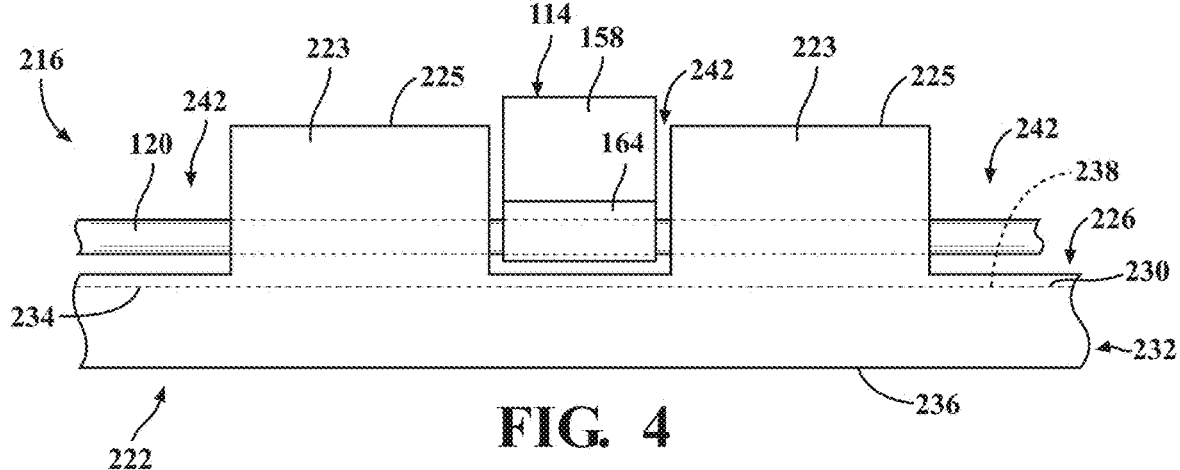
FIG. 4 schematically depicts a partial front view of another embodiment of a curtain airbag assembly including folding tabs in a preassembled state, according to one or more embodiments shown and described herein.
Figure 5:
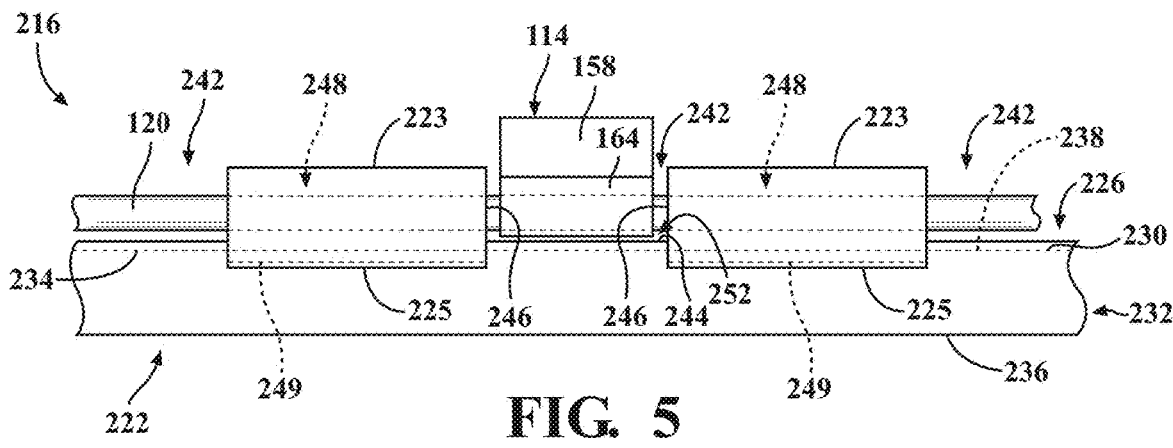
FIG. 5 schematically depicts a partial front view of the curtain airbag assembly of FIG. 4 with the folding tabs in an assembled state, according to one or more embodiments shown and described herein.

Referring now to FIGS. 4 and 5, another embodiment of a curtain airbag assembly 216 is depicted. Rather than forming the cutouts 142 by removing material of the pocket portion 126 or forming discontinuous pockets 248 in the pocket portion 126, as described herein and illustrated in FIG. 2, the curtain airbag assembly 216 includes an inflatable curtain airbag 222 having a plurality of tabs 223 that define respective pockets 248. As shown in FIG. 4, the inflatable curtain airbag 222 is depicted in a partially assembled state with a free end 225 of each of the tabs 223 unsecured to the rest of the inflatable curtain airbag 222. As shown in FIG. 5, the inflatable curtain airbag 222 is depicted in an assembled state with the free end 225 of each of the tabs 223 secured to the rest of the inflatable curtain airbag 222. As the curtain airbag assembly 216 illustrated in FIGS. 4 and 5 is similar to the curtain airbag assembly 116 illustrated in FIG. 2, it should be appreciated that like reference numbers may be used to refer to like parts.

With more particularity, the curtain airbag assembly 216 is illustrated including the inflatable curtain airbag 222 and the rigid bar 120. As described herein, the inflatable curtain airbag 222 may be formed in any suitable manner including one or more layers of flexible material. In embodiments, the inflatable curtain airbag 222 is formed by one-piece weaving such that the inflatable curtain airbag 222 is a one-piece, monolithic structure. The inflatable curtain airbag 222 includes a pocket portion 226 having a lower edge 230, and a body portion 232 having an upper edge 234 and an opposite lower edge 236. It should be appreciated that the body portion 232 is inflatable.

In embodiments, a lower weaving line 238, formed by a thread or any other suitable stitching material, is provided to define the lower edge 230 of the pocket portion 226 and the upper edge 234 of the body portion 232. Accordingly, the body portion 232 extends from the lower edge 230 of the pocket portion 226.

As noted above, the pocket portion 226 includes a plurality of tabs 223 spaced apart from one another along a length of the pocket portion 226 in the vehicle longitudinal direction. As described herein, each tab 223 includes a free end 225 to be joined to the pocket portion 226 or the body portion 232 in any suitable manner such as, for example, stitching or the like. As the tabs 223 are spaced apart from one another, the tabs 223 define cutouts 242 formed in the pocket portion 226 in which a respective receiving members 114 are positioned to engage the rigid bar 120 extending through the pockets 248 defined by each of the tabs 223.

Each cutout 242 is defined by a lower cutout edge 244 and a pair of side cutout edges 246 extending along side edges of adjacent tabs 223. As shown, the lower cutout edge 244 is spaced apart from the lower weaving line 238 so as to not intersect the body portion 232 of the inflatable curtain airbag 222. As the tabs 223 are folded about a medial portion during assembly, as shown in FIG. 5, a height of the cutout 242 extending in the vehicle vertical direction is substantially one-half a height of the pair of side cutout edges 246, and a distance between the pair of side cutout edges 246 defines a length of the cutout 242 extending in the vehicle longitudinal direction. Although three cutouts 242 are depicted, it should be appreciated that the inflatable curtain airbag 222 may have any number of cutouts 242 extending along a length of the inflatable curtain airbag 222 in the vehicle longitudinal direction.

As shown in FIG. 5, the tabs 223 are shown folded about the medial portion and the free end 225 of each of the tabs 223 is secured to the body portion 232 below the lower weaving line 238. The free end 225 of each tab 223 may be secured in any suitable manner such as, for example, by stitching or the like, to define respective pockets 248. As such, a tab stitch line 249 is shown in FIG. 5 securing the free end 225 of the tabs 223 to the body portion 232. However, as noted above, the free end 225 of each of the tabs 223 may be secured to the pocket portion 226 by providing the tab stitch line 249 above the lower weaving line 238.

As noted above, the curtain airbag assembly 216 includes the rigid bar 120 extending through the inflatable curtain airbag 222. Specifically, the rigid bar 120 extends through the plurality of pockets 248 defined within the pocket portion 226 above the tab stitch line 249 and, more particularly, above the lower weaving line 238, when provided. With the rigid bar 120 inserted into the pockets 248 of the pocket portion 226 of the inflatable curtain airbag 222, a gap 252 is provided between the rigid bar 120 and the lower cutout edge 244 of the inflatable curtain airbag 222. The gap 252 has a height defined by a lower surface of the rigid bar 120 and the lower cutout edge 244.

As shown in FIGS. 4 and 5, a receiving member 114 extends through the cutout 242 and engages the rigid bar 120, thereby securing the inflatable curtain airbag 222 to the receiving member 114, which, as shown in FIG. 1, is mounted to the frame 102 of the vehicle 100. Although only a single receiving member 114 is depicted in FIGS. 4 and 5 within one of the cutouts 242, it should be appreciated that a receiving member 114 may be positioned within respective cutouts 242 and received within the gap 252 defined by the rigid bar 120 and the lower cutout edge 244 of the respective cutout 242.

In other embodiments, it should be appreciated that the tabs 223 may be separately attached to the body portion 232 of the inflatable curtain airbag 222 rather than being formed as a one-piece, monolithic structure with the rest of the inflatable curtain airbag 222. Accordingly, in such embodiments, opposite free ends of the tabs 223 are secured to respective front and back surfaces of the body portion 232 of the inflatable curtain airbag 222 in any suitable manner such as, for example, stitching, rather than just attaching the free end 225 of the tabs 223 as discussed herein and illustrated in FIGS. 4 and 5. It should be appreciated that separately attaching the tabs 223 requires an additional step of positioning the tabs 223 relative to the body portion 232 of the inflatable curtain airbag 222 and individually attaching opposite free ends of each tab 223 to the body portion 232. Although this may require additional time, there may be an overall time and/or cost savings by not requiring individually forming the plurality of tabs 223 in the pocket portion 226 of the inflatable curtain airbag 222.

Figure 6:
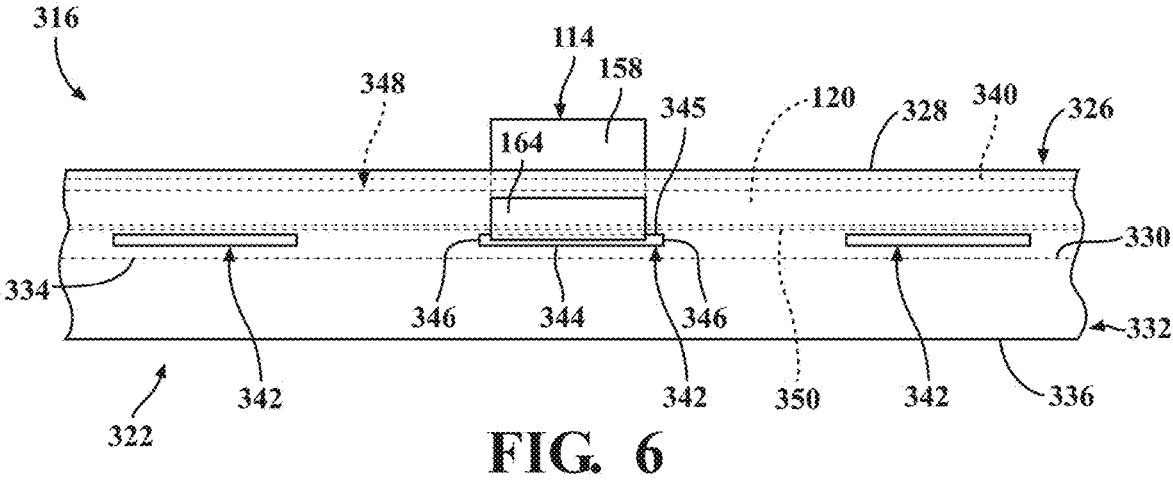
FIG. 6 schematically depicts a partial front view of another embodiment of a curtain airbag assembly defining a plurality of slots, according to one or more embodiments shown and described herein.

Referring now to FIG. 6, another embodiment of a curtain airbag assembly 316 is depicted. Rather than forming the cutouts 142 by removing material of the inflatable curtain airbag 122 from an upper edge 128 of the pocket portion 126, as described herein and illustrated in FIG. 2, or securing tabs 223, as described herein and illustrated in FIGS. 4 and 5, a plurality of cutouts 342 are formed in the curtain airbag assembly 316 entirely below a pocket 348. Stated another way, the plurality of cutouts 342 are completely encircled by material forming an inflatable curtain airbag 322 of the curtain airbag assembly 316. As the curtain airbag assembly 316 illustrated in FIG. 6 is similar to the curtain airbag assembly 116 illustrated in FIG. 2, it should be appreciated that like reference numbers may be used to refer to like parts.

With more particularity, the curtain airbag assembly 316 is illustrated including the inflatable curtain airbag 322 and the rigid bar 120. As described herein, the inflatable curtain airbag 322 may be formed in any suitable manner including one or more layers of flexible material. In embodiments, the inflatable curtain airbag 322 is formed by one-piece weaving such that the inflatable curtain airbag 322 is a one-piece, monolithic structure. The inflatable curtain airbag 322 includes a pocket portion 326 having an upper edge 328 and an opposite lower edge 330, and a body portion 332 having an upper edge 334 and an opposite lower edge 336. It should be appreciated that the body portion 332 is inflatable.

In embodiments, the pocket portion 326 includes the lower edge 330 and body portion 332 includes the upper edge 334. Accordingly, the body portion 332 extends from the lower edge 330 of the pocket portion 326. In embodiments, an upper weaving line 340, formed by a thread or any other suitable stitching material, is provided below the upper edge 328 of the pocket portion 326.

As shown in FIG. 6, a plurality of cutouts 342 are formed within the pocket portion 326 by removing individual, spaced apart sections of the pocket portion 326. Each cutout 342 is defined by a lower cutout edge 344, an upper cutout edge 345, and a pair of side cutout edges 346 extending between the lower cutout edge 344 and the upper cutout edge 345. As shown, the lower cutout edge 344 is spaced apart from the body portion 332 of the inflatable curtain airbag 322. A height of the pair of side cutout edges 346 defines a height of the cutout 342 extending in the vehicle vertical direction, and a distance between the pair of side cutout edges 346 defines a length of the cutout 342 extending in the vehicle longitudinal direction. As shown in FIG. 6, the length of each cutout 342 is greater than the height of the cutout 342. Although three cutouts 342 are depicted, it should be appreciated that the inflatable curtain airbag 322 may have any number of cutouts 342 extending along a length of the inflatable curtain airbag 322 in the vehicle longitudinal direction.

As noted above, the curtain airbag assembly 316 includes the rigid bar 120 extending through the inflatable curtain airbag 322. Specifically, the rigid bar 120 extends through a pocket 348 defined within the pocket portion 326 above the body portion 332 and below the upper weaving line 340, when provided. Contrary to the embodiments of the inflatable curtain airbag 122, 222 discussed herein, which includes a plurality of spaced apart pockets 148, 248 defined by the cutouts 142, 242 and/or tabs 223 (FIGS. 2-5), the inflatable curtain airbag 322 illustrated in FIG. 6 defines a single, uninterrupted pocket 348 through which the rigid bar 120 extends.

In embodiments, a restriction weaving line 350, formed by a thread or any other suitable stitching material, is provided above the body portion 332. The restriction weaving line 350 reduces a height of the pocket 348 in the vehicle vertical direction. Accordingly, the reduction in the height of the pocket 348 limits movement of the rigid bar 120, which is received within the pocket 348, in the vehicle vertical direction. As shown in FIG. 6, the cutouts 342 are provided between the body portion 332 and the restriction weaving line 350. As such, the restriction weaving line 350 further restricts the rigid bar 120 from dropping within the pocket 348 into the path of the cutouts 342.

As shown in FIG. 6, a receiving member 114 extends through the cutout 342 and engages the rigid bar 120, thereby securing the inflatable curtain airbag 322 to the receiving member 114, which, as shown in FIG. 1, is mounted to the frame 102 of the vehicle 100. Although only a single receiving member 114 is depicted in FIG. 6 extending through one of the cutouts 342, it should be appreciated that a receiving member 114 may extend through respective cutouts 342 and engage the rigid bar 120 at spaced apart intervals. In other embodiments, the rigid bar 120 may be fixed to a rear surface of the inflatable curtain airbag 322 in any suitable manner such as, for example, mechanical fastening, adhesives, radio frequency (RF) welding, ultrasonic welding, or any other suitable method known in the art.

Figure 7:
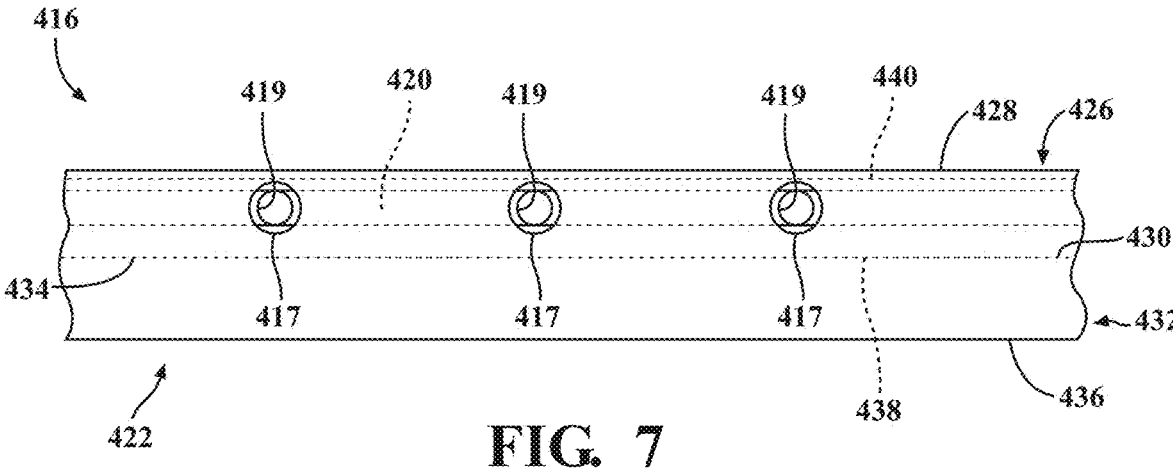
FIG. 7 schematically depicts a partial front view of another embodiment of a curtain airbag assembly including a rigid bar defining a plurality of holes, according to one or more embodiments shown and described herein.

Referring now to FIG. 7, another embodiment of a curtain airbag assembly 416 is depicted. Rather than removing material, as depicted in FIGS. 2, 3, and 6, or attaching tabs 223, as depicted in FIGS. 4 and 5, a plurality of attachment holes 417 are formed in an inflatable curtain airbag 422 and receiving holes 419 are formed in a rigid bar 420 at locations corresponding to the attachment holes 417 formed in the inflatable curtain airbag 422.

With more particularity, the curtain airbag assembly 416 is illustrated including the inflatable curtain airbag 422 and the rigid bar 420. As described herein, the inflatable curtain airbag 422 may be formed in any suitable manner including one or more layers of flexible material. In embodiments, the inflatable curtain airbag 422 is formed by one-piece weaving such that the inflatable curtain airbag 422 is a one-piece, monolithic structure. The inflatable curtain airbag 422 includes an attachment portion 426 having an upper edge 428 and an opposite lower edge 430, and a body portion 432 having an upper edge 434 and an opposite lower edge 436. It should be appreciated that the body portion 432 is inflatable.

In embodiments, a lower weaving line 438, formed by a thread or any other suitable stitching material, is provided to define the lower edge 430 of the attachment portion 426 and the upper edge 434 of the body portion 432. Accordingly, the body portion 432 extends from the lower edge 430 of the attachment portion 426. In embodiments, an upper weaving line 440, formed by a thread or any other suitable stitching material, is provided below the upper edge 428 of the attachment portion 426.

As shown in FIG. 7, a plurality of attachment holes 417 are formed in the attachment portion 426 above the lower weaving line 438 and below the upper weaving line 440, when provided. Although, three attachment holes 417 are illustrated in FIG. 7, it should be appreciated that any number of attachment holes 417 may be formed in the attachment portion 426.

As noted above, the curtain airbag assembly 416 includes the rigid bar 420 provided behind the inflatable curtain airbag 422. Accordingly, in the embodiment illustrated in FIG. 7, the inflatable curtain airbag 422 does not define a pocket in which the rigid bar 420 extends. Rather, the rigid bar 420 is positioned completely exterior of the inflatable curtain airbag 422. A plurality of receiving holes 419 are formed in a surface of the rigid bar 420 at locations corresponding to the attachment holes 417 formed in the attachment portion 426 of the inflatable curtain airbag 422. In embodiments, the rigid bar 420 has a square or rectangular cross-section such that the receiving holes 419 in the rigid bar 420 are formed through flat inboard and outboard surfaces and the rigid bar 420 may sit flush against the frame 102 of the vehicle 100 (FIG. 1). In embodiments, the rigid bar 420 may be fixed to a rear surface of the inflatable curtain airbag 422 in any suitable manner such as, for example, mechanical fastening, adhesives, radio frequency (RF) welding, ultrasonic welding, or any other suitable method known in the art.

In use, the receiving holes 419 formed in the rigid bar 420 are aligned with corresponding attachment holes 417 formed in the attachment portion 426 of the inflatable curtain airbag 422. Thereafter, the inflatable curtain airbag 422 and the rigid bar 420 are positioned along the frame 102 of the vehicle 100 (FIG. 1) and fasteners, such as bolts, screws, or the like, are inserted through the attachment holes 417 in the inflatable curtain airbag 422 and the receiving holes 419 in the rigid bar 420 to secure the inflatable curtain airbag 422 and the rigid bar 420 to the frame 102. It should be appreciated that in this embodiment, the receiving members 114 are not utilized as the inflatable curtain airbag 422 and the rigid bar 420 are secured to the frame 102 via the fasteners rather than utilizing the receiving members 114 to engage the rigid bar 420.

From the above, it is to be appreciated that defined herein is a curtain airbag assembly including an inflator, an inflatable curtain airbag, and a rigid bar. In embodiments, the rigid bar extends through one or more pockets formed in a pocket portion of the inflatable curtain airbag. Upon installing the curtain airbag assembly on a vehicle, the rigid bar engages a plurality of receiving members mounted to the frame so as to eliminate the need for additional fasteners.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A curtain airbag assembly comprising:
   an inflator;
   an inflatable curtain airbag comprising:
      a pocket portion defining a plurality of pockets and a plurality of cutouts spaced apart from one another along a vehicle longitudinal direction of the pocket portion, each cutout of the plurality of cutouts formed between adjacent pockets of the plurality of pockets; and a body portion extending from the pocket portion, the body portion inflating upon receiving gas from the inflator when activated; and a rigid bar extending through the plurality of pockets and the plurality of cutouts, wherein each cutout of the plurality of cutouts is defined by a lower cutout edge and a pair of side cutout edges, and wherein each cutout of the plurality of cutouts is open to an upper edge of the pocket portion, wherein a restriction weaving line is formed in the pocket portion above a lower weaving line defining a lower edge of the pocket portion and an upper edge of the body portion, the restriction weaving line limiting vertical movement of the rigid bar in a vehicle vertical direction within the plurality of pockets.

2. The curtain airbag assembly of claim 1, wherein a gap is provided between the rigid bar and the lower cutout edge of each cutout.

3. The curtain airbag assembly of claim 1, wherein the pocket portion defines a plurality of tabs spaced apart from one another, each tab of the plurality of tabs defining a respective pocket of the plurality of pockets.

4. The curtain airbag assembly of claim 3, wherein a free end of each tab of the plurality of tabs is secured to the body portion or the pocket portion.

5. The curtain airbag assembly of claim 4, wherein the free end of each tab of the plurality of tabs is secured to the body portion.

6. The curtain airbag assembly of claim 1, wherein each cutout of the plurality of cutouts is completely encircled by material forming the inflatable curtain airbag.

7. The curtain airbag assembly of claim 6, wherein each cutout has a length extending in the vehicle longitudinal direction greater than a height of the cutout extending in a vehicle vertical direction.

8. The curtain airbag assembly of claim 1, wherein the inflatable curtain airbag is formed by one-piece weaving such that the inflatable curtain airbag is a one-piece, monolithic structure.

9. A vehicle comprising:

a vehicle body member;

a plurality of receiving members spaced apart from one another and mounted to the vehicle body member; and a curtain airbag assembly comprising:

an inflator;

an inflatable curtain airbag comprising:

a pocket portion defining one or more pockets and a plurality of cutouts spaced apart from one another along a vehicle longitudinal direction;

a body portion extending from the pocket portion, the body portion inflating upon receiving gas from the inflator when activated;

a lower weaving line defining a lower edge of the pocket portion and an upper edge of the body portion; and a restriction weaving line formed in the pocket portion above the lower weaving line; and a rigid bar extending through the one or more pockets, wherein the restriction weaving line limits vertical movement of the rigid bar in a vehicle vertical direction within the one or more pockets, wherein each receiving member of the plurality of receiving members engages the rigid bar to secure the inflatable curtain airbag to the vehicle body member.

10. The vehicle of claim 9, wherein:

each receiving member of the plurality of receiving members is received within a respective cutout of the plurality of cutouts;

each receiving member of the plurality of receiving members comprises an outboard wall, an inboard wall opposite the outboard wall, and a connecting wall extending between a lower end of the outboard wall and a lower end of the inboard wall; and the rigid bar is received within a space defined by the outboard wall, the inboard wall, and the connecting wall.

11. The vehicle of claim 10, wherein the inboard wall has a serpentine shape to accommodate the rigid bar having a circular cross-sectional shape.

12. The vehicle of claim 9, wherein:

each cutout of the plurality of cutouts is completely encircled by material forming the inflatable curtain airbag; and each cutout has a length extending in the vehicle longitudinal direction greater than a height of the cutout extending in a vehicle vertical direction.

\* \* \* \* \*